(12) United States Patent
Yamauchi

(10) Patent No.: US 7,443,582 B2
(45) Date of Patent: Oct. 28, 2008

(54) SCREEN AND IMAGE PROJECTION SYSTEM USING THE SAME

(75) Inventor: Naofumi Yamauchi, c/o Seiko Instruments Inc. 8, Nakase 1-chome, Mihama-ku, Chiba-shi, Chiba 261-8507 (JP)

(73) Assignee: Naofumi Yamauchi (JP)

( * ) Notice: Subject to any disclaimer, the term of this patent is extended or adjusted under 35 U.S.C. 154(b) by 531 days.

(21) Appl. No.: 11/258,804

(22) Filed: Oct. 26, 2005

(65) Prior Publication Data
US 2006/0098279 A1     May 11, 2006

(30) Foreign Application Priority Data
Nov. 10, 2004    (JP)   ............................ 2004-326573

(51) Int. Cl.
*G03B 21/56* (2006.01)
(52) U.S. Cl. ..................................... 359/449
(58) Field of Classification Search ................. 359/443, 359/449, 459
See application file for complete search history.

(56) References Cited
U.S. PATENT DOCUMENTS

| | | | | |
|---|---|---|---|---|
| 4,911,529 A | * | 3/1990 | Van De Ven | 359/454 |
| 6,282,023 B1 | * | 8/2001 | Bergman | 359/449 |
| 6,424,463 B1 | * | 7/2002 | Nishitani | 359/449 |
| 6,600,600 B2 | * | 7/2003 | Chen | 359/459 |
| 2005/0275952 A1 | * | 12/2005 | Odagiri et al. | 359/707 |

* cited by examiner

*Primary Examiner*—Christopher Mahoney
(74) *Attorney, Agent, or Firm*—Adams & Wilks

(57) ABSTRACT

In order to provide a screen having a projection surface on which of external light has little influence and has a large gain, as well as a projection surface that has a wide viewing angle and nature-views, the screen according to the present invention includes a directional diffusion layer for diffusing and transmitting light from a specific direction and linearly transmitting light from other directions, an isotropic diffusion layer for approximately isotropically diffusing light regardless of an incident angle thereof, and a light reflecting layer provided between the directional diffusion layer and the isotropic diffusion layer.

19 Claims, 6 Drawing Sheets

SCREEN AND IMAGE PROJECTION SYSTEM USING THE SAME

BACKGROUND OF THE INVENTION

1. Field of the Invention

The present invention relates to a screen onto which an optical image from a high brightness CRT, a liquid crystal projector, or the like is projected, and to an image projection system having the screen.

2. Description of the Related Art

An image projection systems, such as a projector device, which displays images by projecting optical images using a high brightness CRT, a liquid crystal projector, or the like can simply and easily display high definition images on a large screen, and therefore has been used as information communication tool among multiple users in various ways.

A screen used in such an image projection system is devised with a technique with which beads for light diffusion are distributed across a surface of the screen to realize a wide viewing angle, to thereby provide multiple observers with improved viewability. Also, it is known to provide a directionally reflective structure, such as a lenticular lens, for the screen surface, to thereby realize a bright image area except that the viewing field angle is narrowed. Further, in JP 05-061120 A (Patent Document 1), a technique is disclosed with which directionality and isotropy are both given to the reflection characteristics of the screen by dispersing diffusion particles in the lenticular lens.

A conventional screen containing diffusion materials, such as beads, is capable of realizing a wide viewing angle, but has a dark image area due to a low gain. On the other hand, a screen using a lenticular lens has a high gain due to its high directionality, and is capable of providing a bright image area, but has a narrow viewing field angle and tends to pick up external light. Further, even when diffusion particles are dispersed in a lenticular lens, there remains a problem in that the lenticular lens tends to pick up external light. That is, it has not been possible to realize both of a screen having a wide viewing angle and a screen having high brightness on which external light has little influence at the same time.

SUMMARY OF THE INVENTION

It is therefore an object of the present invention to provide a screen to be used for displaying both of a projected image having a wide viewing angle and nature-views and a projected image having high directionality and brightness on which external light has little influence.

According to the present invention, there is provided a screen for displaying a projected optical image, including: a directional diffusion layer for scattering and transmitting light whose incident angle is within a specific angle range, and linearly transmitting light whose incident angle is outside the specific angle range; an isotropic diffusion layer for approximately isotropically diffusing light regardless of an incident angle thereof; and a light reflecting layer provided between the directional diffusion layer and the isotropic diffusion layer. Further, the specific angle range differs according to an area in a screen plane.

Also, as the directional diffusion layer, it is possible to use a layered lens sheet in which high refractive index regions and low refractive index regions formed continuously in a thickness direction are alternately arranged. Here, the inclination angle of an interface between the high refractive index regions and the low refractive index regions (in the thickness direction) differs according to an area of the screen. That is, the direction of the directionality of the directional diffusion layer differs according to an area of the screen.

Alternatively, as the directional diffusion layer, it is possible to use a columella-shaped lens sheet including multiple columella-shaped structures, in which regions having a refractive index higher than that of a peripheral region thereof are formed continuously in a thickness direction to be arranged in a plane, with having a function of guiding light in the thickness direction. Here, the center axes of the regions having the high refractive index and the normal line to a surface of the directional diffusion layer form an angle which differs according to an area of the screen. That is, the direction of the directionality of the columella-shaped lens sheet differs according to an area of the screen.

Also, the isotropic diffusion layer is an isotropic diffusion sheet containing multiple air bubbles in a polymer material. Here, fine particles having a higher reflectance than that of the polymer material is mixed into the isotropic diffusion sheet. As the fine particles, it is possible to use a filler made of a white pigment. In addition, a protective layer is provided for at least one surface of the isotropic diffusion sheet. As the protective layer, it is possible to use a polymer base member containing a reflecting filler.

Also, a surface diffusion layer is formed for a surface of the directional diffusion layer. The surface diffusion layer has a surface diffusion structure.

Meanwhile, the image projection system according to the present invention includes a screen having any of the configurations described above and an optical image projector for projecting an optical image onto the screen. For instance, the image projection system includes: a screen; and an optical image projector that projects an optical image onto the screen, in which the screen includes a directional diffusion layer for scattering and transmitting light whose incident angle is within a specific angle range, and linearly transmitting light whose incident angle is outside the specific angle range, an isotropic diffusion layer for approximately isotropically diffusing light regardless of the incident angle thereof, and a light reflecting layer provided between the directional diffusion layer and the isotropic diffusion layer. Here, the angle of view of projected light from the optical image projector falls within the specific angle range. Alternatively, the center line of the specific angle range is directed toward the center of the projected light from the optical image projector.

Still alternatively, the projected light from the optical image projector is incident on the directional diffusion layer at an angle outside the specific angle range. Alternatively, the center line of the specific angle range and the center line of a projected light flux from the optical image projector are symmetric with each other with respect to the normal line to a screen surface.

As described above, according to the present invention, it becomes possible to make a selection, in accordance with a purpose, from among a projected image which is bright having directionality and high brightness, and a projected image having a wide viewing angle and nature-views. Therefore, an effect is provided that it becomes possible to use one screen for multiple purposes. That is, the directional diffusion surface of the screen is used to make it possible to observe a sharp screen image even under a state in which illumination light is turned on. Also, it becomes possible to obtain a bright image even with a projector whose brightness is low, which can reduce the burden of thermal design and light source design in projector production. On the other hand, the isotropic diffusion surface of the screen is used in a dark room to make it possible to project an image having high brightness, a wide viewing angle, and nature-views. As described above, it becomes possible to project an image having favorable image quality regardless of an image projection environment and desired projection image quality.

DETAILED DESCRIPTION OF THE PREFERRED EMBODIMENTS

Figure 1:
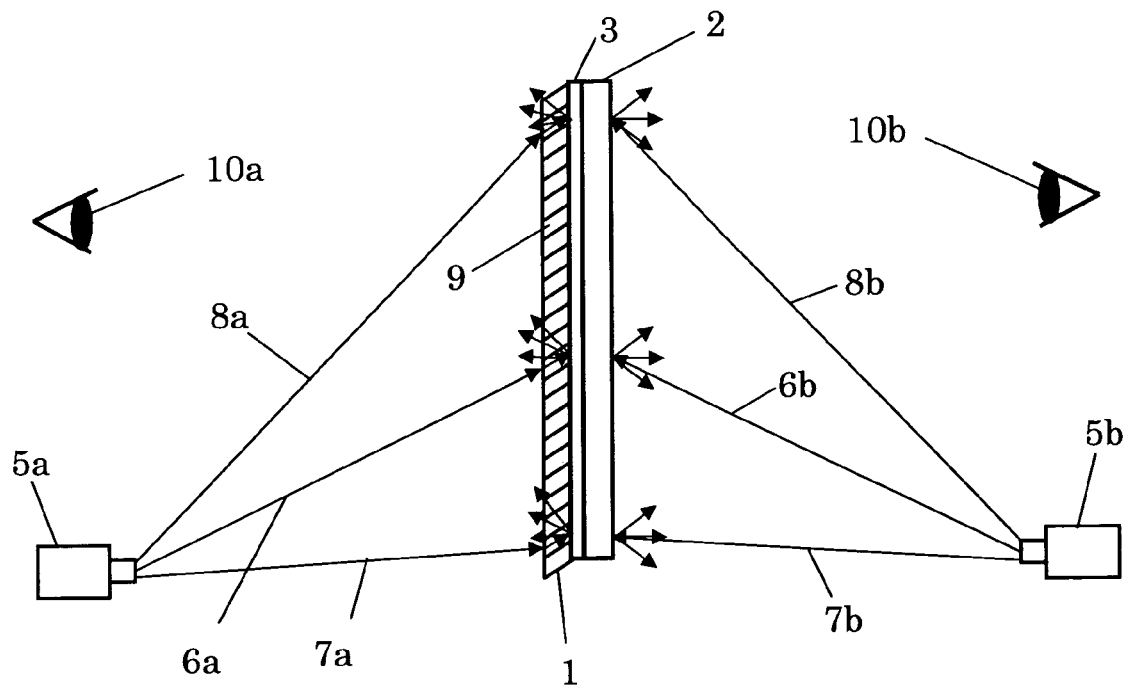
FIG. 1 is an explanatory diagram showing an example of a configuration of the screen according to the present invention.

A fundamental configuration of the screen according to the present invention is shown in FIG. 1. As shown in the drawing, the screen includes a directional diffusion layer 1, an isotropic diffusion layer 2, and a light reflecting layer 3. The directional diffusion layer 1 scatters and transmits light incident at angles within a specific angle range and linearly transmits light incident at other angles. The isotropic diffusion layer 2 approximately isotropically diffuses light regardless of its incident angle. The light reflecting layer 3 is provided between the directional diffusion layer 1 and the isotropic diffusion layer 2. With the configuration, an optical image incident from a directional diffusion layer side is diffused and reflected with directionality while linearly reflecting illumination light incident from a ceiling or the like in a direction outside an observer's viewing point, so it becomes possible to obtain an image with high brightness and high contrast even in a bright room under illumination. On the other hand, light incident from an isotropic diffusion layer side is diffused and reflected at a wide viewing angle, so it becomes possible to obtain an image having a wide viewing angle. The image obtained from the isotropic diffusion layer becomes an image having naturalness through observation in a room in which brightness has been adjusted as appropriate. The light reflecting layer realizes a bright image by reflecting light incident on the directional diffusion layer and the isotropic diffusion layer with efficiency. With the simple configuration described above, the screen according to the present invention is capable of providing both of a bright projected image having directionality and a projected image having a wide viewing angle property and naturalness through selection from among the image projection surfaces.

Here, the directional diffusion layer may be a mono-directional diffusion layer given directionality in a specific direction in a screen plane or may be a multi-directional diffusion layer given directionality in arbitrary multiple directions. By selecting the directions of the directionality as appropriate, it becomes possible to give directionality appropriate to arrangement of observers, which makes it possible to provide a bright image for observers in a wider viewing angle range.

Also, by using layered lenses, in which layered high refractive index regions and low refractive index regions that are formed continuously in a thickness direction in a plane are alternately arranged, as the directional diffusion layer, it becomes possible to generate a difference in diffusion characteristics between a direction vertical to a long-side direction of the layer and a direction parallel to the long-side direction (anisotropy is generated in the diffusion characteristics). Alternatively, by arranging columella-shaped lenses that are high refractive index regions that guide light in the thickness direction of the plane in a dense manner in a low refractive index region, it becomes possible to generate anisotropy of the diffusion characteristics in a direction in which the thickness direction of the plane in the high refractive index regions is inclined.

Also, when the inclination of the layered lenses or the columella-shaped lenses is distributed, this results in a situation where directionality is also distributed. Further, with a directional diffusion layer having multiple regions whose layered lens or columella-shaped lens inclinations are different from each other, it becomes possible to construct a multi-directional diffusion layer having multi-directional directionality.

As the directional diffusion layer, for instance, it is possible to use a film layer made of a translucent polymer, which diffuses light from a specific direction and linearly transmits other light, and having optical anisotropy. Also, as the isotropic diffusion layer, for instance, it is possible to use a film layer that approximately isotropically diffuses light regardless of its incident angle and is optically isotropic.

Alternatively, it is possible to use a film layer made of dense hollow polymers as the isotropic diffusion layer. In the case of such an isotropic diffusion layer, there exists a large refractive index difference between the polymers and the air in the hollow polymers, so it becomes possible to obtain high light reflecting characteristics. Also, by mixing a white pigment into a polymer film, it becomes possible to further improve a reflectance. Further, the isotropic diffusion layer may be constructed by coating both surfaces of coagulated hollow polymers with a protective layer made of a polymer base material mixed with a white pigment. With the configuration, it becomes possible to increase the mechanical strength of the isotropic diffusion layer and also improve the light reflectance thereof.

Embodiment

Hereinafter, an embodiment of the screen according to the present invention will be described. It is well known that a transparent sheet, on whose surface micro-projection-and-depression structures having anisotropy, such as prisms having directionality, have been formed, has a function that is analogous to that of the directional diffusion layer according to the present invention. In the present invention, however, a directional diffusion layer is used which has a refractive index distribution having a predetermined shape in a plane and has microstructures formed continuously in the thickness direction of the plane and guiding light in the thickness direction. The directional diffusion layer having the configuration is capable of scattering and transmitting light in a specific direction with efficiency and linearly transmitting other light with efficiency. It is preferable that the layer thickness of the directional diffusion layer is set at around 1 µm to 2 µm. When the directional diffusion layer is thin and has a thickness of around 1 to 20 µm, handling is facilitated when the directional diffusion layer is formed on a transparent base member and is used. Also, when the directional diffusion layer is thick and has a thickness of 20 µm to 2 mm, it has a thickness sufficient to maintain mechanical strength. Therefore, even when the directional diffusion layer is used alone without using the transparent base member, it is possible to conduct various processing on a surface.

Figure 7A:
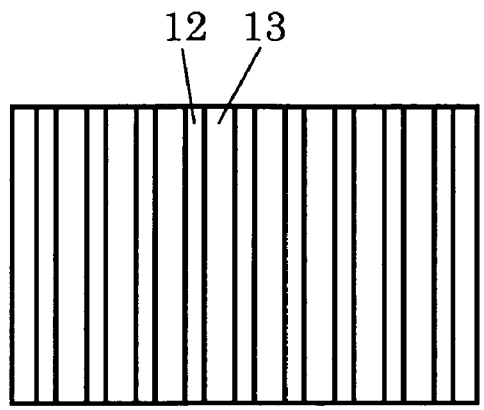
FIGS. 7A and 7B are each a schematic plan view showing microstructures of a directional diffusion layer used in the present invention.
Figure 7B:
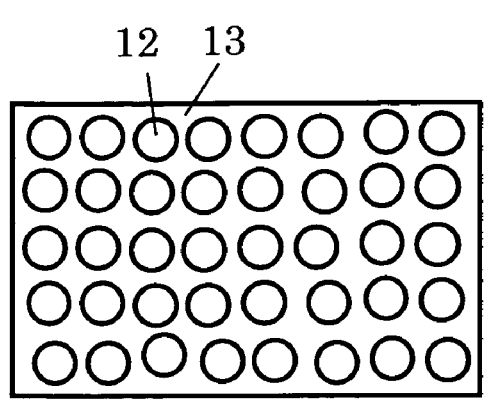

In the directional diffusion layer, two kinds of micro-regions having mutually different refractive indexes are formed continuously between a front surface and a back surface. The two kinds of micro-regions are distributed regularly or irregularly in the plane. That is, when viewed locally, the directional diffusion layer has a structure, in which first micro-regions (high refractive index regions) are surrounded by second micro-regions (low refractive index regions), and the structure can be referred to as the "micro-lens structure". With the shape of the micro-regions in the plane, differences of the optical characteristics of the directional diffusion layer are generated. FIGS. 7A and 7B each show a concrete planar arrangement shape of the micro-regions constituting the directional diffusion layer. FIG. 7A shows a configuration, in which high refractive index regions 12 and low refractive index regions 13 formed continuously in the thickness direction are alternately arranged in a plane, as the shape of the micro-regions. When the micro-regions in the plane are formed in the layered manner, as to the long-side direction component of the layer, incoming light is subjected to an action similar to that in the case of light incident on an ordinary uniform transparent sheet. On the other hand, as to the short-side direction component of the layer, light having a specific incident angle is scattered and transmitted and light with other incident angles is transmitted linearly (such micro-regions will be hereinafter referred to as the "layered lenses"). That is, the directional diffusion layer has characteristics as a mono-directional diffusion layer. In the case of the directional diffusion layer constructed using the layered lenses, a configuration, in which the long-side direction of the layered lenses is set vertically or horizontally when viewed from an observer, is effective at improving visibility.

FIG. 7B shows a configuration in which the micro-regions in the plane have an approximately circular shape or a polygonal shape. High refractive index regions 12 having an approximately circular shape or a polygonal shape are formed to have a refractive index that is higher than that of a low refractive index region 13 surrounding the high refractive index regions 12. When light is incident on the directional diffusion layer, regardless of its incoming direction, light having a specific incident angle is diffused and transmitted and other light is linearly transmitted like in the case of an ordinary homogeneous transparent sheet. That is, the directional diffusion layer is controlled in diffusion characteristics in two directions in the plane. With the directional diffusion layer, it becomes possible to realize a projector screen having uniform brightness characteristics in a wide angle range regardless of an observation direction. It should be noted that when the microstructures in the plane have an anisotropic shape such as an elliptic shape or a rectangular shape, this results in characteristics between those of the directional diffusion layer described above, whose microstructures are layered, and those of the directional diffusion layer whose microstructures have an approximately circular shape or a polygonal shape. That is, as the anisotropy of the microstructures in the plane is increased, the characteristics get closer to those of the directional diffusion layer having the layered microstructures and as the anisotropy of the microstructures in the plane is decreased, the characteristics get closer to those of the directional diffusion layer having the microstructures in the approximately circular shape or the polygonal shape. Accordingly, it becomes possible to adjust the viewing angle characteristics of the projector screen with respect to a specific direction by adjusting the anisotropy of the microstructures in the plane. A screen including the directional diffusion layer having the microstructures in the approximately circular shape will be described with reference to FIG. 5. As shown in the drawing, a directional diffusion layer 9 has a configuration in which micro-columella-shaped structures are formed in a plane at a predetermined density. Axial regions of the columella-shaped structures have a refractive index that is higher than that of an outer peripheral region surrounding the axial regions and have a function of guiding light in the thickness direction. That is, the axial regions correspond to the high refractive index regions 12 and the outer peripheral region corresponds to the low refractive index region 13. The columella-shaped structures have the same function as refractive index distribution rod-shaped lenses. Hereinafter, the columella-shaped structures will be referred to as the "columella-shaped lenses" and the optical axis direction of the columella-shaped lenses will be referred to as the "declination direction". Here, it is possible to adjust and set an inclination angle (inclination of the declination direction with respect to the normal line to a layer plane) to an arbitrary angle in a range from 0 degrees to 70 degrees.

Next, another example of the structure of the directional diffusion layer will be described. In this example, a structure will be described in which graded index columella-shaped lenses, whose refractive index is continuously increased toward the lens centers, or step index columella-shaped lenses, whose refractive index of columella-shaped regions is discontinuously increased from that of an outer peripheral region surrounding the columella-shaped regions, are used instead of the columella-shaped lenses described above. That is, the directional diffusion layer in this example has a film structure in which multiple such lenses are arranged in a planar manner. Even in the case of a directional diffusion layer whose microstructures are layered, it is possible to use the lens structures described above. The microstructures function as layered lenses having the same action as refractive index distribution one-dimensional lenses (cylindrical lenses, for instance).

It is possible to manufacture the directional diffusion layer by, for instance, irradiating ultraviolet light onto a liquid reactive layer made of two or more kinds of photopolymerization compounds having different refractive indexes through a photomask that has undergone gradation processing. Here, it is possible to control the state of refractive index distribution using differences in photopolymerization speed between the photopolymerization compounds ascribable to a situation in which the intensity of the irradiated light varies from site to site. Also, it is possible to control the declination direction of the columella-shaped lenses by adjusting the incident angle of the light irradiated onto the liquid reactive layer. Further, it is possible to arbitrarily set the shape of the columella-shaped lenses in the plane based on the pattern shape of the photomask. For instance, when layered lenses are formed, it is sufficient that a gradation mask, for which a stripe pattern has been formed, is used.

In addition, it is possible to form the directional diffusion layer by irradiating ultraviolet light onto a liquid reactive layer applied onto a predetermined substrate in the manner described above. In this case, the directional diffusion layer formed by reaction-curing the liquid reactive layer can be used without being peeled off the substrate. On the other hand, when a directional diffusion layer having a film thickness of around 20 μm or more is formed by applying a thick liquid reactive layer onto a reaction stage or a reaction roller and curing the applied liquid reactive layer, the directional diffusion layer can be used after being peeled off the reaction stage or the reaction roller.

Next, the behavior of light in the directional diffusion layer will be described. The action possessed by a directional diffusion layer, whose microstructures have a shape other than an approximately circular shape, is substantially the same as that of a directional diffusion layer described below, whose microstructures have an approximately circular shape, so the description thereof will be omitted.

In the case of a directional diffusion layer whose microstructures are step index columella-shaped lenses, light incident on the high refractive index regions 12 is refracted toward the normal line side of the directional diffusion layer incident plane according to Snell's law. The incoming light to the high refractive index regions 12 is incident on boundary surfaces with the low refractive index region 13 and when the incident angle to the boundary surfaces is larger than a critical angle, the incident light is totally reflected. The incoming light is thus repeatedly reflected by the boundary surfaces between the high refractive index regions 12 and the low refractive index region 13, is guided in the columella-shaped structures, and exits from a side opposite to an incoming plane.

Here, the outgoing position and outgoing direction of light from the columella-shaped lenses are determined by the thickness of the directional diffusion layer and the incident angle and incoming position of light to the high refractive index regions. When light is incident at the same incident angle but the light is incident at different incoming positions, this results in different outgoing angles at which the light exits from a surface after being guided through an inner portion. A projected image from a projector is incident at various incident angles and at various incoming positions. Accordingly, the projected image is subjected to an action similar to scattering by a front surface in a certain scattering angle range. The scattering angle is determined by a refractive index difference or a refractive index gradient between the high refractive index regions 12 and the low refractive index region 13, the thickness of the directional diffusion layer, and the lens diameter of the columella-shaped lenses. For instance, there is a tendency that light exits so that the scattering angle becomes larger as the refractive index difference or the refractive index gradient between the high refractive index regions 12 and the low refractive index region 13 becomes greater. Also, the scattering angle becomes larger as the refractive index difference between the high refractive index regions 12 and the low refractive index region 13 becomes greater. Further, the haze value becomes greater as the thickness of the directional diffusion layer becomes thicker, the lens radius becomes smaller, and the number and density of the columella-shaped lenses in the plane becomes greater. Still further, when the incident angle of light exceeds a specific angle, the incoming light propagates rectilinearly and is transmitted without being scattered. Hereinafter, an incident angle range, in which incoming light is scattered, will be referred to as the "scattering incident angle", and an incident angle range, in which incoming light propagates rectilinearly and is transmitted, will be referred to as the "linear transmission angle". The scattering incident angle and the linear transmission angle exist in a like manner even when the micro-regions in the plane have a layered shape or an anisotropic shape.

In the screen according to the present invention, it is possible to use a directional diffusion layer that has columella-shaped lenses with a lens diameter of 2 μm to 500 μm and a lens height (thickness of directional diffusion layer) of 10 μm to 2 mm. When consideration is given to manufacturing yield, optical utilization efficiency, ease of handling, and the like, however, it is preferable that the lens diameter is set at 5 μm to 100 μm and the lens height is set at 20 μm to 300 μm. Also, it is possible to use columella-shaped lenses having a refractive index difference of 0.01 to 0.05. When a thin layer having the lens height of 1 μm to 20 μm is needed, the lenses are formed on the substrate and is used as the directional diffusion layer.

Next, a case will be described in which the incident angle is in the range of the linear transmission angle. In this case, incoming light is incident on the incident plane of the directional diffusion layer at a large incident angle that is equal to or larger than the scattering incident angle. Accordingly, even when the incoming light to the high refractive index regions 12 propagates through an inner portion of the sheet and reaches the boundaries between the high refractive index regions 12 and the low refractive index regions 13, the incident angle to the boundaries is smaller than the critical angle, so the light is not totally reflected at the boundaries and is transmitted to the low refractive index regions 13. This is the same as the characteristics in the case where light, whose incident angle is equal to or larger than a cutoff angle in an ordinary optical waveguide or the like, is incident, although in the case of the directional diffusion layer, the low refractive index region of the columella-shaped lenses adjacent to each other is formed continuously in the sheet, so there hardly occurs light reflection at the boundaries between the low refractive index region and the high refractive index regions. As a result, the incoming light is almost linearly transmitted like in the case of light incident on an ordinary transparent film.

As described above, the directional diffusion layer used in the present invention possesses superior directionality, so it becomes possible to obtain a very bright and sharp image in a viewing field direction in which light is scattered and reflected. In directions in which light is not scattered and reflected, however, the brightness of a projected image declines sharply and visibility is lowered. In view of this problem, in order to adjust the diffusion angle of reflected light or transmitted light, diffusion particles are mixed into the directional diffusion layer (the inner portion, front surface, or back surface thereof). With the configuration, it also becomes possible to compensate for shortage of visibility in a direction in which light is not scattered.

Figure 5:
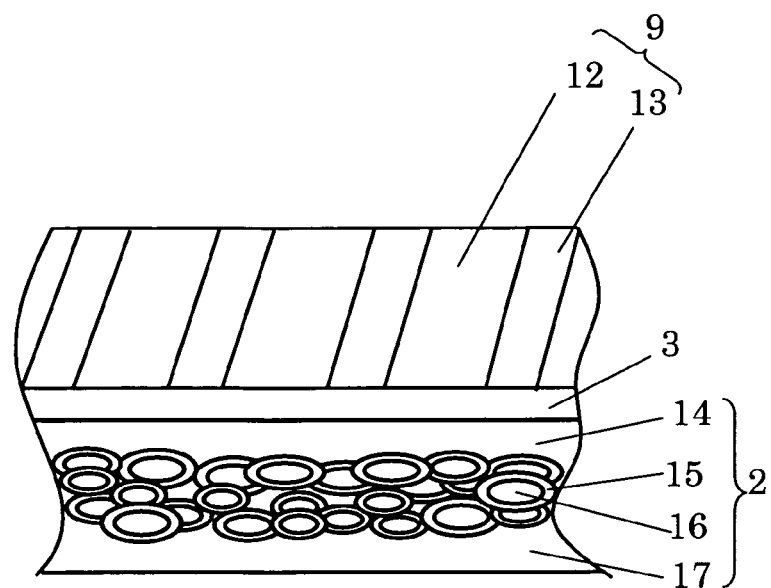
FIG. 5 is an enlarged view schematically showing a cross-sectional configuration of the screen according to the present invention.

Next, the isotropic diffusion layer will be described. FIG. 5 is a cross-sectional view schematically showing a configuration of the screen according to the present invention that uses an isotropic diffusion layer 2 including an infinite number of hollow polymers. A light reflecting layer 3 is provided between the directional diffusion layer having the configuration, in which the high refractive index regions 12 are sandwiched between the low refractive index regions 13, and the isotropic diffusion layer 2. In FIG. 5, the isotropic diffusion layer 2 is formed through coagulation of an infinite number of hollow polymers and the hollow polymers have structures in which air bubbles 16 are wrapped in polymer coats 15. The hollow polymers are distributed with various diameters, although production with an average diameter in a range from 20 μm to 200 μm is possible. Also, both surfaces of the coagulated hollow polymers are sandwiched between a first protective layer 14 and a second protective layer 17. The protective layers are formed by mixing a filler, such as oxide particles, which has a high reflectance into a polymer base material. Therefore, the protective layers have high light reflectance and mechanical strength and has an action of mechanically protecting the hollow polymers and, at the same time, improving the light reflectance of the isotropic diffusion layer. It is possible to set the layer thickness of the isotropic diffusion layer at 25 μm to 400 μm. When the layer thickness of the isotropic diffusion layer is reduced from the range, this results in an unpreferable situation in which the light reflectance decreases sharply and the diffusion characteristics are also lowered. In addition, when the thickness of the sheet is reduced, handling at the time of manufacturing becomes difficult.

The isotropic diffusion layer having the configuration described above hardly absorbs light, so when the thickness is reduced, a part of light is transmitted, is reflected by the light reflecting layer 3 arranged on the back of the isotropic diffusion layer, and exits from a surface. By adjusting the layer thickness of the isotropic diffusion layer as appropriate, contribution of light reflected by the light reflecting layer 3 appears. Therefore, it is possible to optimize viewing angle characteristics by adjusting the distribution of the diffusion angle of light.

It is possible to easily obtain the isotropic diffusion layer by extending a material obtained by mixing a filler, such as oxide particles, into a polymer base material. With this method, it becomes possible to produce the isotropic diffusion sheet containing multiple air bubbles in a polymer material. With a filler obtained by mixing an ultra-fine particle filler of a material, such as $BaSO_4$, $TiO_2$' or $MgO$, which has a high reflectance into an ordinary filler, it becomes possible to mix $BaSO_4$, $TiO_2$' $MgO$, or the like into the hollow polymer coats and the protective layers and also obtain a diffusion sheet having a high reflectance.

Figure 8:
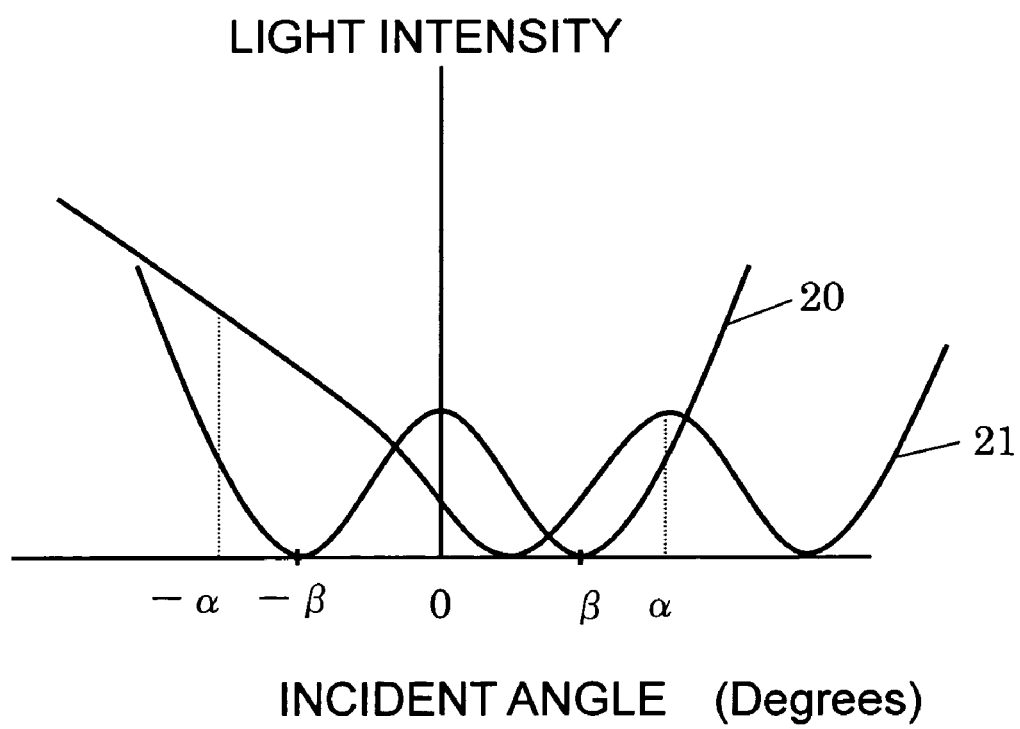
FIG. 8 is a graph showing the optical characteristics of the directional diffusion layer used in the present invention.

FIG. 8 shows the light transmission characteristics of the directional diffusion layer. In FIG. 8, the horizontal axis represents the incident angle of light to the directional diffusion layer, while the vertical axis represents the intensity of light transmitted at each incident angle. In the drawing, a characteristic curve 20 shows the characteristics of the directional diffusion layer in the case where the declination direction is at 0 degrees and a characteristic curve 21 shows the characteristics of the directional diffusion layer in the case where the declination direction is at a degrees. It can be seen that in the case of the characteristic curve 20, the intensity of light transmitted through the directional diffusion layer at angles $\pm\beta$ becomes approximately zero. When the incident angle is in a range from $-\beta$ to $\beta$, light is scattered and transmitted and when the absolute value of the incident angle is greater than $\beta$, light is linearly transmitted without being scattered. In other words, in the case of transmission, the incident angle in the range from $-\beta$ to $\beta$ is the scattering incident angle and the incident angle outside the range is the linear transmission angle. In this specification, for ease of explanation, the angle $\beta$ is referred to as the "scattering incident angle". On the other hand, in the case of the characteristic curve 21 in which the declination direction of the columella-shaped lenses is inclined by a degrees, the range of the scattering incident angle is shifted by the a degrees as it is as compared with the case where the declination direction is at zero degrees. In this case, the angle width of the scattering incident angle does not change substantially and the range of the scattering incident angle shifts to a range from $(\alpha-\beta)$ to $(\alpha+\beta)$. Therefore, in FIG. 8, light incident at the angle $\alpha$ is scattered at the time of transmission, while light incident at the angle $-\alpha$ is linearly transmitted without being scattered. Consequently, it becomes possible to obtain a bright image having a wide viewing angle by irradiating an optical image from a projector with an inclination of an optical axis by a with respect to the screen and, at the same time, setting the divergence angle of the projected image at $\pm\beta$. It is possible to control $\beta$ to assume an arbitrary value on the order of 10 to 45 degrees by adjusting the layer thickness of the directional diffusion layer, the diameter of the columella-shaped lenses, the refractive index difference or refractive index distribution of the columella-shaped lenses, and the like.

Figure 6A:
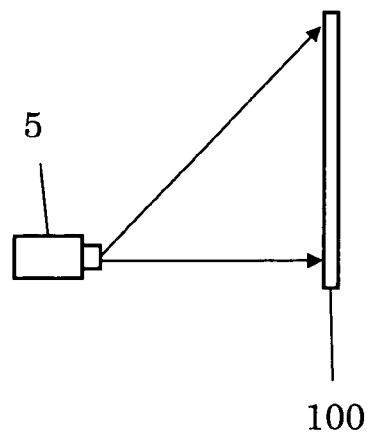
FIGS. 6A to 6C are each an explanatory diagram showing arrangement of the screen and a projector.
Figure 6B:
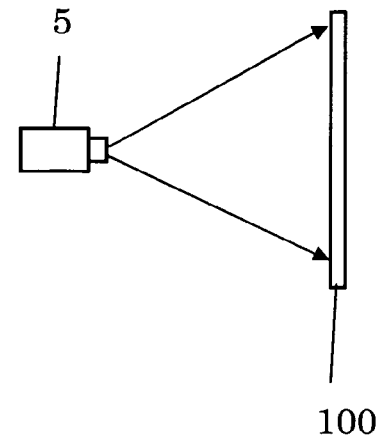
Figure 6C:
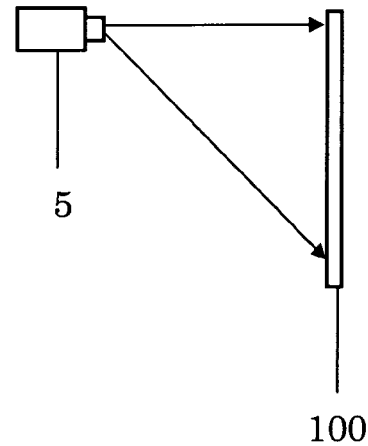

Next, the positional relationship between the screen and the projector will be described using FIGS. 6A to 6C. FIG. 6A shows a state in which a projector 5 is disposed to oppose a lower portion of a screen 100, FIG. 6B shows a state in which the projector 5 is disposed to oppose the center portion of the screen 100, and FIG. 6C shows a state in which the projector 5 is disposed to oppose an upper portion of the screen 100. Hereinafter, the arrangements shown in FIGS. 6A to 6C will be referred to as the "lower position", "center position", and "upper position", respectively. The screen according to the present invention is applicable to all of the arrangements described above. When an image is projected from a directional diffusion layer side, it is important that the declination direction of the columella-shaped lenses in the directional diffusion layer roughly coincides with the optical axis direction of the projected image or that the declination direction of the columella-shaped lenses roughly coincides with a direction that is symmetric with the optical axis direction with respect to a perpendicular on the screen surface. Also, it is important that the incident angle of the projected optical image is in the scattering incident angle range of the directional diffusion layer used in the projector screen.

Also, the screen according to the present invention is constructed by sandwiching a common light reflecting layer between the directional diffusion layer, with which it is possible to obtain an image having high brightness even under illumination, and the isotropic diffusion layer with which it is possible to obtain an image having a wide viewing angle and naturalness, so it becomes possible to achieve a flexible structure with which weight reduction and thickness reduction are possible. For instance, it is possible to wind the screen according to the present invention into a tubular case for storage and stretch the screen around a support frame for use, which facilitates handling.

Hereinafter, concrete examples of the screen according to the present invention will be described in detail.

FIRST CONCRETE EXAMPLE

A first concrete example of the screen according to the present invention will be described with reference to FIG. 1. A screen in this example includes a directional diffusion layer 1, an isotropic diffusion layer 2, and a light reflecting layer 3. Both surfaces of the screen are usable for image projection. The directional diffusion layer 1 includes the microstructures having the layered lens or columella-shaped lens function described above. Also, the isotropic diffusion layer 2 includes the coagulated hollow polymers described above. Further, the light reflecting layer 3 is an approximately 200 nm Ag reflecting film formed on the back surface of the directional diffusion layer 1 through vapor deposition. In addition, the light reflecting layer 3 and the isotropic diffusion layer 2 are joined together through a transparent adhesive agent. A first projector 5a is arranged on a directional diffusion layer 1 side and projects an optical image onto the directional diffusion layer 1. In this example, the microstructures 9 existing in the directional diffusion layer 1 are oriented approximately toward the optical axis 6a of a projected light flux from the projector 5a. Also, the divergence angle of lights 7a and 8a constituting the angle of view of the projected light is in the scattering reflecting angle range of the directional diffusion layer 1. It does not matter whether the microstructures 9 are the layered lens structures or the columella-shaped lens structures. In the configuration shown in FIG. 1, when the microstructures 9 are the layered lens structures, this results in a situation in which layered lenses extending in a direction vertical to the paper plane are arranged from top to bottom.

The optical image from the first projector 5a is incident on the directional diffusion layer 1 at the scattering incident angle, is reflected by the light reflecting film 3 after the scattering incoming, is transmitted through the directional diffusion layer 1 again, enters into a first viewing point 10a, and is observed. At this time, the range of the diffusion angle of the light entering into the first viewing point 10a is in an angle range that is approximately the same as the scattering incident angle and it is possible to observe a bright image having high directionality. Also, light from illumination in proximity to an upper portion of the screen contains many linear transmission angle components of the directional diffusion layer 1. Therefore, most of the light is linearly transmitted through the directional diffusion layer 1, is specularly reflected by the light reflecting layer 3, and does not enter into the first viewing point 10a. Consequently, it becomes possible for an observer to observe a high-contrast and high-brightness image with less influences of illumination light even under illumination.

On the other hand, an optical image from a second projector 5b is isotropically diffused by the isotropic diffusion layer 2 and the light reflecting layer 3 and is observed at a second viewing point. The isotropic diffusion layer 2 has approximately isotropic diffusion characteristics, so it becomes possible to observe a favorable image from the second viewing point 10b regardless of the magnitude of the divergence angle of the projected light from the second projector 5b indicated by lines 7b and 8b and regardless of the direction of the optical axis 6b of the projected light. In this case, the image is isotropically diffused and reflected, so it becomes possible to obtain a natural image without glare. However, the isotropic diffusion layer 2 also reflects external light, such as illumination light, at the same time and the external light is superimposed on the projected image as a bias, so image quality is deteriorated. Accordingly, when image projection is performed from an isotropic diffusion layer 2 side, it is preferable that the image projection be performed in a dark room in which there are less influences of external light.

It should be noted that the material of the light reflecting layer 3 is not limited to Ag and any other metal, such as an alloy of Ag and Pd or Al, may be used instead so long as it has a high reflectance. Also, aside from the metals, a dielectric multilayer mirror formed by alternately laminating a low refractive index dielectric substance, such as $MgF_2$ or $SiO_2$, and a high refractive index dielectric substance, such as $TiO_2$ or $ZrO_2$, may be used instead.

Figure 9:
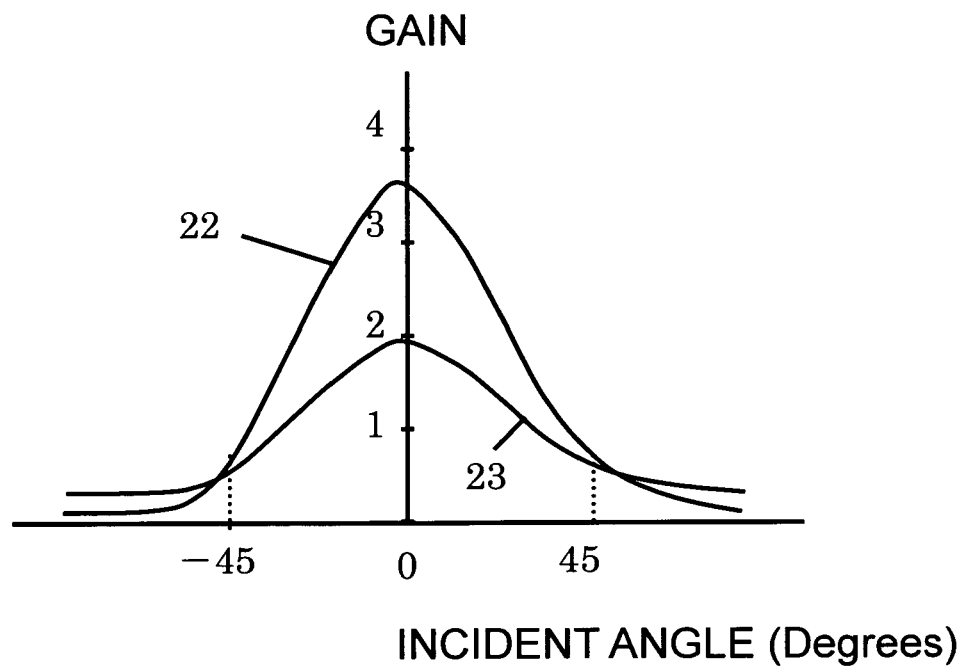
FIG. 9 is a graph showing the gain characteristics on a directional diffusion layer side of the screen according to the present invention.

FIG. 9 is a graph in which the brightness characteristics on the directional diffusion layer side of the screen in the first concrete example and the brightness characteristics of a conventional lenticular screen are compared with each other. First, a white image is projected from the front to the directional diffusion layer side of the screen and brightness on the screen is measured by moving a luminance meter in a horizontal direction on a circular arc with respect to the center of the screen. Next, the same measurement was conducted for a white calibration plate. Then, a ratio between a measurement result obtained for the screen and a measurement result obtained for the white calibration plate was calculated as a gain. FIG. 9 shows a measurement result 22 concerning the screen according to the present invention and a measurement result 23 concerning the lenticular screen for comparison. It can be seen from the drawing that the directional diffusion layer side of the screen according to the present invention has directionality that is similar to that of the conventional lenticular screen and also has brightness that is higher than that of the conventional lenticular screen in a viewing field angle range from −45 degrees to +45 degrees.

Figure 10:
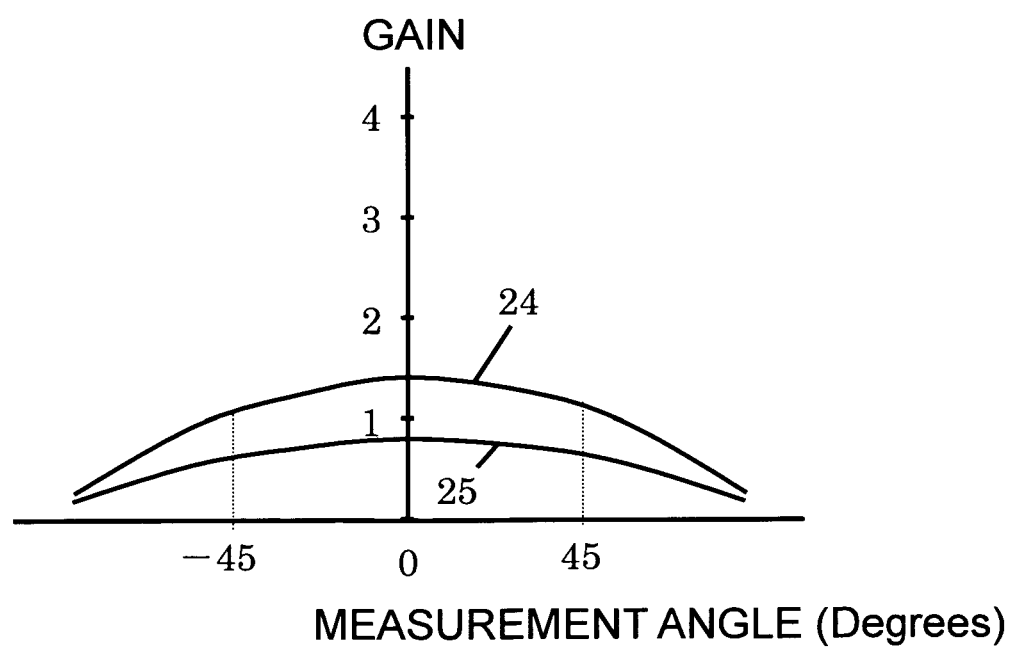
FIG. 10 is a graph showing the gain characteristics on an isotropic diffusion layer side of the screen according to the present invention.

FIG. 10 is a graph in which the brightness characteristics of the isotropic diffusion layer side of the screen according to the first concrete example and the brightness characteristics of a conventional beads screen are compared with each other. A method used to measure the characteristics is the same as that in the case of FIG. 9, so the description thereof will be omitted. FIG. 10 shows a measurement result 24 concerning the screen according to the present invention and a measurement result 25 concerning the beads screen for comparison. It can be understood from the results that the isotropic diffusion layer side of the screen according to the present invention has high brightness characteristics at every viewing field angle as compared with the conventional beads screen. It can also be understood that the isotropic diffusion layer side of the screen according to the present invention has brightness characteristics exceeding those of the white calibration plate in the viewing field angle range from −45 degrees to +45 degrees. In addition, it is confirmed that the image displayed on the isotropic diffusion layer side of the screen according to the present invention becomes a fine-grained and natural image as compared with an image displayed on the conventional beads screen.

SECOND CONCRETE EXAMPLE

Figure 2:
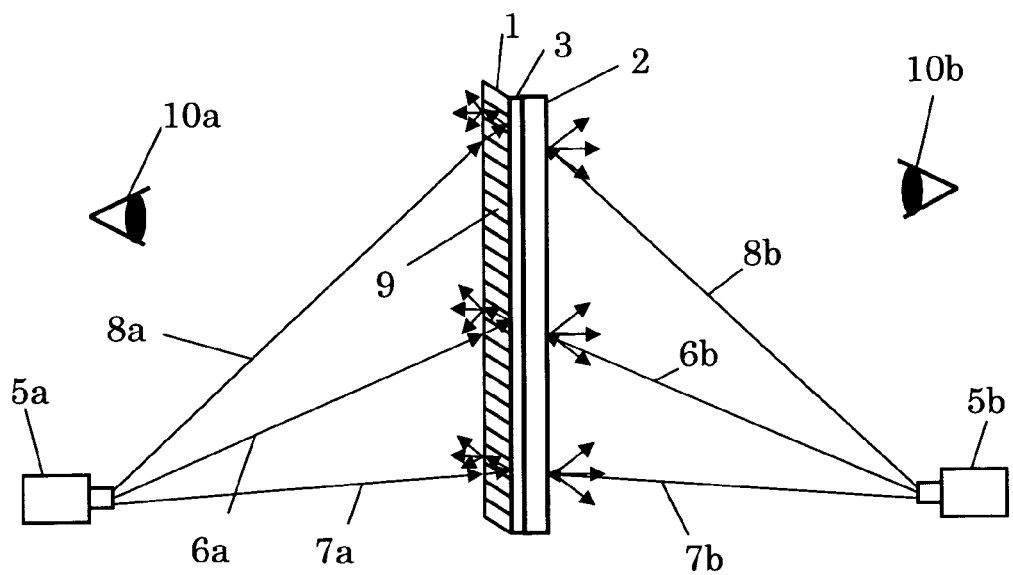
FIG. 2 is an explanatory diagram showing another example of the configuration of the screen according to the present invention.

FIG. 2 is an explanatory diagram showing a second concrete example of the screen according to the present invention. In this example, each element having the same action as in the first concrete example is given the same reference symbol and the description thereof will be omitted. The second concrete example differs from the first concrete example in that the declination direction of the micro-regions 9 constituting the directional diffusion layer 1 is inclined upwardly as compared with the first concrete example, in which the declination direction is inclined downwardly. With the configuration, the projected light from the first projector 5a is incident on the directional diffusion layer 1 at the linear transmission angle. Accordingly, the projected light propagates rectilinearly through the inner portion of the directional diffusion layer 1 without being diffused and is reflected by the light reflecting layer 3. The reflected projected light re-enters into the directional diffusion layer 1 at the scattering incident angle, is diffused when exiting from the surface of the directional diffusion layer 1, and enters into the first viewing point 10a.

With the configuration in this concrete example, it becomes possible to obtain a sharper image because light diffusion is small as compared with the case of the first concrete example. However, a viewing field angle originally possessed by the directional diffusion layer 1 becomes a substantial viewing field angle in this example, so the substantial viewing field angle becomes narrower than that in the first concrete example. Also, in this concrete example, the direction of the microstructures is directed upward, so it is preferable that illumination in proximity to the screen be performed from a lower side. Alternatively, by arranging the projector at an upper position, it becomes possible to obtain a high-brightness image that is not influenced by illumination under an ordinary illumination arrangement environment. In addition, no change of the diffusion characteristics of the isotropic diffusion layer 2 is caused by the change of the declination direction of the directional diffusion layer 1.

THIRD CONCRETE EXAMPLE

Figure 3:
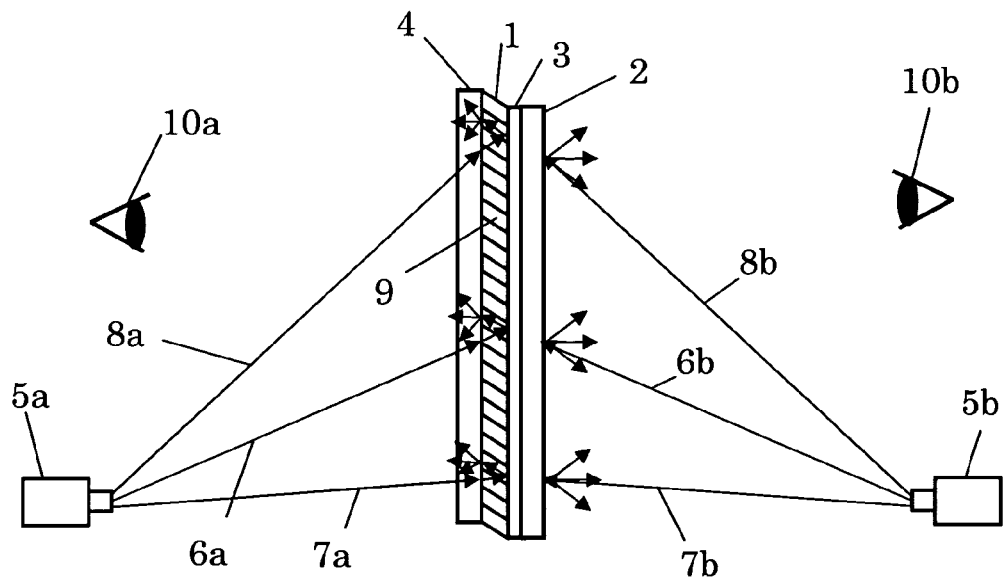
FIG. 3 is an explanatory diagram showing still another example of the configuration of the screen according to the present invention.

FIG. 3 shows a third concrete example of the screen according to the present invention. In this example, a configuration will be described in which a surface diffusion layer 4 is joined to a surface of the directional diffusion layer 1 in the second concrete example. In this example, each element having the same action as in the second concrete example is given the same reference symbol and the description thereof will be omitted. The directional diffusion layer 1 diffuses light transmitted through the inner portion at a predetermined incident angle, but its surface is smooth, so reflection of light by the surface occurs and image quality is lowered. In particular, at a position at which the projected light from the first projector 5a is reflected specularly, a bright spot called a "hot spot" occurs. In this concrete example, in order to avoid the problem, the surface diffusion layer 4 is joined to the surface of the directional diffusion layer 1. The surface diffusion layer 4 is obtained by forming random micro-projection-and-depression structures for a surface of a transparent film through graining of the film or the like or by forming projection and depression structures for the surface of the transparent film through application of micro-diffusion particles onto the film surface together with a binder, and scatters reflected light from the surface. The magnitude of the scattering depends also on light irradiation intensity and a surface reflectance at the screen surface. It is preferable that the magnitude of the scattering be around 5 to 55% and more preferably around 15 to 45% on a haze value basis.

In addition, the haze value of the surface diffusion layer 4 depends also on the reflectance of the surface. When a low reflecting coating or a nonreflecting coating is formed by applying a low refractive index dielectric film or a dielectric multilayer film onto a surface of a transparent film in a wet manner or a dry manner and a diffusion particle layer is formed on the coating, or when micro-diffusion structures are formed on a surface of a transparent film and a low reflecting coating or a nonreflecting coating is further formed on the surface of the film through application of a dielectric film or a dielectric multilayer film in a wet manner or a dry manner, it becomes possible to further reduce the haze value.

Also, when the transparent film constituting the surface diffusion layer 4 has a thickness of 400 pm or more, the surface diffusion layer 4 becomes capable of also functioning as a protective base member that protects the surface of the directional diffusion layer 1 from external force, humidity, dirt from the hands, and the like. When the protective base member is desired for both surfaces of the screen, a surface diffusion layer that is the same as the surface diffusion layer 4 may be additionally joined to the surface of the isotropic diffusion layer.

FOURTH CONCRETE EXAMPLE

In this concrete example, surface diffusion structures are formed by creating micro projections and depressions for the surface of the directional diffusion layer 1 in the configuration shown in FIG. 1. The micro-projection-and-depression structures are formed for the surface by immersing the directional diffusion layer 1 in methyl alcohol under a state where its back surface is covered with a protective sheet. With the method, the surfaces of the high refractive index regions of the microstructures constituting the directional diffusion layer 1 are eluted earlier than the surfaces of the low refractive index regions, so it becomes possible to form projection and depression structures in which the high refractive index region surfaces are depressed. Here, it is possible to change the depth of the projections and depressions by adjusting the time of the immersion into the solvent. By forming the micro projections and depressions for the surface of the directional diffusion layer 1, it becomes possible to prevent the reflection of external light, such as a hot spot, from occurring like in the third concrete example.

It should be noted that as the solvent used to form the projection and depression structures for the surface, aside from methyl alcohol, it is possible to use a low molecular alcohol such as ethyl alcohol or isopropyl alcohol, a ketone such as acetone, or the like that dissolves the directional diffusion layer.

FIFTH CONCRETE EXAMPLE

In this concrete example, like in the fourth concrete example, surface diffusion structures are formed by creating micro projections and depressions for the surface of the directional diffusion layer 1. In this example, the micro-projection-and-depression structures of the surface are formed by mixing transparent spherical beads into an ultraviolet curing bonding agent, applying the mixture onto the surface of the directional diffusion layer 1, and curing the bonding agent through irradiation of ultraviolet light. Here, acrylic beads having a particle diameter of 5 μm are mixed into the ultraviolet curing bonding agent. Also, the haze value with respect to surface diffusion is set to around 5 to 55% by adjusting the mixing density of the beads.

In this example, it is possible to use spherical beads having a particle diameter of 1 to 20 μm. Also, as the spherical beads, aside from the acrylic beads, it is possible to use transparent polymer beads such as styrene beads, or inorganic oxide beads such as silica beads or titania beads.

SIXTH CONCRETE EXAMPLE

Figure 4:
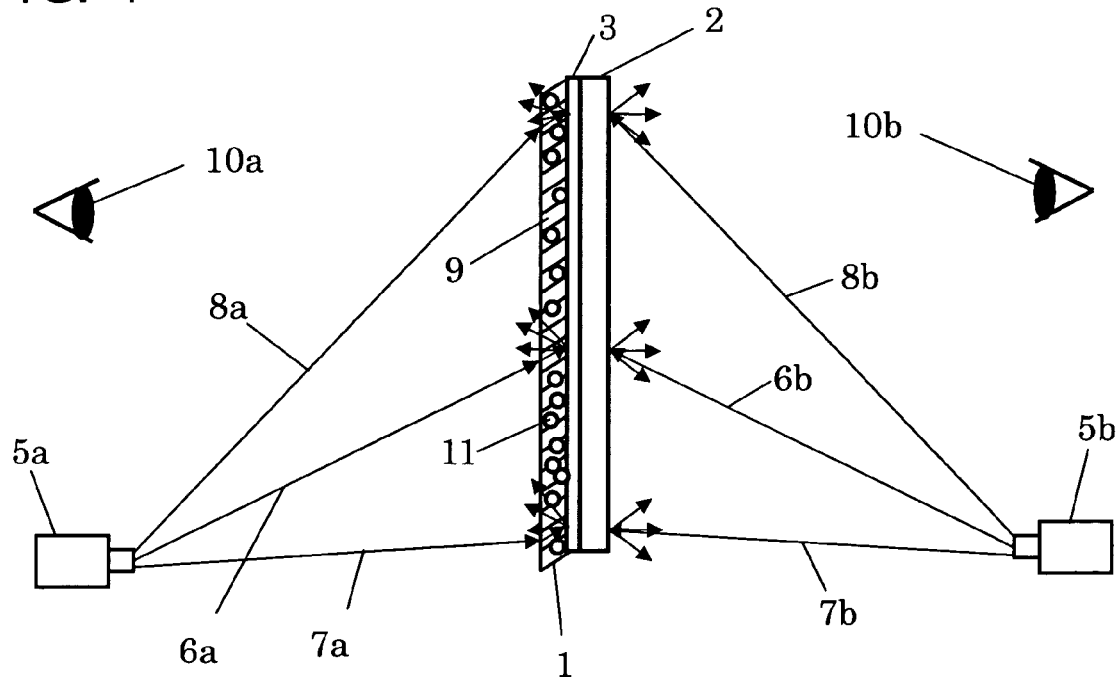
FIG. 4 is an explanatory diagram showing another example of the configuration of the screen according to the present invention.

A sixth concrete example of the screen according to the present invention is shown in FIG. 4. A configuration in this example differs from that in the first concrete example in that diffusion particles 11 are mixed into the directional diffusion layer 1. The diffusion particles used in this example are particles with an average particle diameter of 60 nm to 20 μm and have a refractive index that is different from that of the material of the directional diffusion layer. As the shape of the particles, it is possible to use an indefinite shape, a rod shape, a spherical beads, or the like. In particular, the particle diameter of the spherical beads produced with a sol-gel method is well controlled and it becomes possible to make a selection from among materials having various refractive indexes, so it becomes easy to control screen characteristics.

Figure 11:
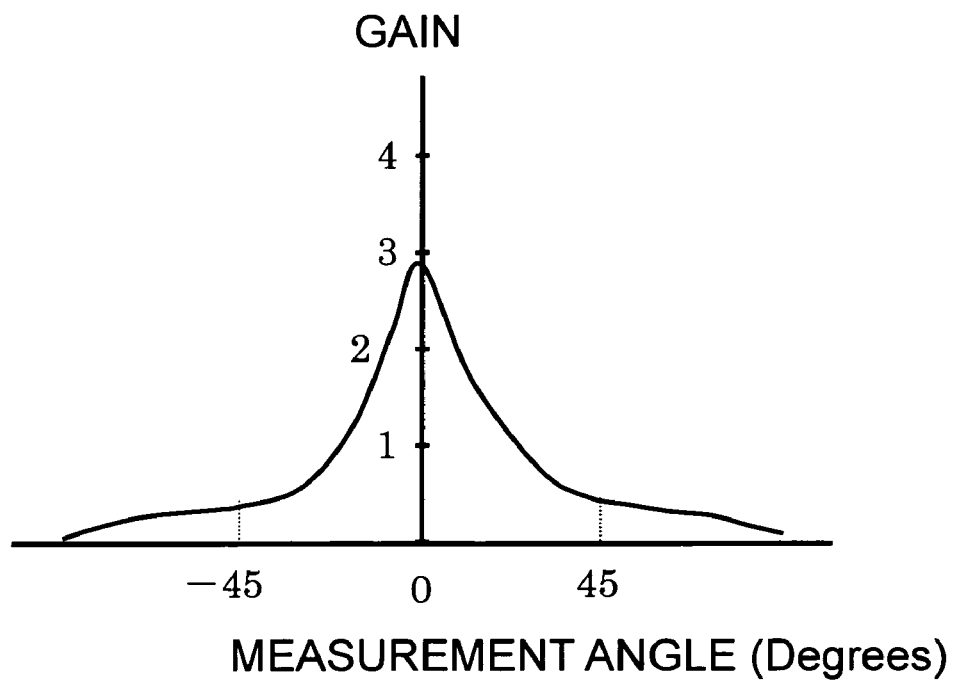
FIG. 11 is another graph showing the gain characteristics on the directional diffusion layer side of the screen according to the present invention.

FIG. 11 shows a measurement result of the diffusion characteristics on the directional diffusion layer side of the screen according to this concrete example. A method used to measure the characteristics is the same as that in the case of FIG. 9, so the description thereof will be omitted. As compared with the curve 22 in FIG. 9, peak brightness is lowered but brightness in regions, in which the viewing angle is large, is improved.

Also, by using transparent particles as the diffusion particles 11, it becomes possible to prevent optical loss due to absorption by the diffusion particles and display a projector image with efficiency. It is not necessarily required to use transparent particles as the diffusion particles and translucent particles may be used instead. Even when the material of particles is transparent, when projections and depressions exist on the surfaces of the particles or the particles are porous particles, it is possible to regard the particles as translucent particles. Even when such translucent particles are used, the degree of lowering of light utilization efficiency is small.

Figure 12:
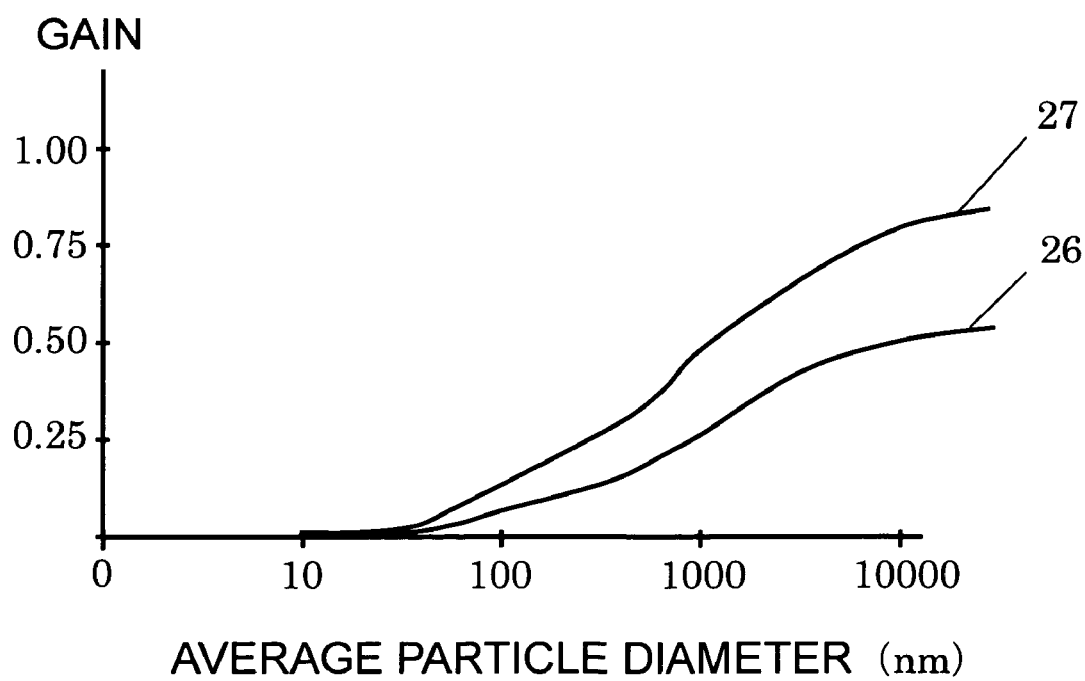
FIG. 12 is a graph showing the gain characteristics with respect to the density and particle diameter of diffusion particles in the directional diffusion layer.

Also, a result of a gain measurement conducted by producing samples using titania beads as the diffusion particles while changing their average particle diameter from 20 nm to 20 μm and by setting a measurement angle to 30 degrees like in the first concrete example is shown in FIG. 12. In the drawing, a characteristic curve 26 shows characteristics in the case where the mixing density of the titania beads is set to 800 and a characteristic curve 27 shows characteristics in the case where the mixing density is set to 1200. It can be seen from FIG. 12 that regardless of the mixing density, the gain starts to rise when the average particle diameter of the titania beads is increased to around 60 nm and light diffusion increases sharply when the average particle diameter exceeds 1 μm. It should be noted that when the average particle diameter exceeds around 10 μm, the diffusion characteristics start to be saturated.

It can be understood from the result described above that as the average particle diameter of the diffusion particles is increased and as the mixing density of the diffusion particles is increased, the diffusion characteristics are increased and therefore the viewing angle characteristics are improved.

It should be noted that production through light curing is not stabilized in the case of samples, whose diffusion particles are larger than ⅕ of the lens diameter of the columella-shaped lenses, and stabilized sample production becomes possible when diffusion particles, whose average particle diameter is around ⅕ or less, are mixed.

As described above, the present invention provides a light-weight and easy-to-handle screen that has both of an image projection surface having high directionality and high brightness and an image projection surface with which it is possible to obtain a natural image having a wide viewing angle.

What is claimed is:

1. A screen for displaying a projected optical image comprising:
    a directional diffusion layer for scattering and transmitting light whose incident angle is within a specific angle range, and linearly transmitting light whose incident angle is outside the specific angle range;
    an isotropic diffusion layer for approximately isotropically diffusing light regardless of an incident angle thereof; and
    a light reflecting layer provided between the directional diffusion layer and the isotropic diffusion layer.
2. A screen according to claim 1,
    wherein the specific angle range differs according to an area on a screen plane.
3. A screen according to claim 1,
    wherein the directional diffusion layer is a layered lens sheet in which high refractive index regions and low refractive index regions formed continuously in a thickness direction are alternately arranged.
4. A screen according to claim 3,
    wherein the high refractive index regions and the low refractive index regions contact with each other to have an interface which forms an inclination angle which differs according to an area on the screen in the thickness direction.
5. A screen according to claim 1,
    wherein the directional diffusion layer is a columella-shaped lens sheet including a plurality of columella-shaped structures, in which regions having a refractive index higher than that of a peripheral region thereof are formed continuously in a thickness direction to be arranged in a plane, with having a function of guiding light in the thickness direction.
6. A screen according to claim 5,
    wherein the regions having the high refractive index includes center axes which form an angle with respect to a normal line to a surface of the directional diffusion layer which differs according to an area on the screen.
7. A screen according to claim 1,
    wherein the isotropic diffusion layer includes coagulated hollow polymers having structures in which gas is wrapped in polymer coats.
8. A screen according to claim 1,
    wherein the isotropic diffusion layer is an isotropic diffusion sheet containing a plurality of air bubbles in a polymeric material.
9. A screen according to claim 8,
    wherein the isotropic diffusion sheet includes fine particles having a reflectance higher than that of the polymer material mixed therein.
10. A screen according to claim 9,
    wherein the fine particles are a filler made of a white pigment.
11. A screen according to claim 8,
    wherein the isotropic diffusion sheet has a protective layer provided for at least one surface thereof.
12. A screen according to claim 11,
    wherein the protective layer is a polymer base member containing a reflective filler.
13. A screen according to claim 1,
    wherein the directional diffusion layer is provided with a surface diffusion layer formed for a surface thereof.
14. A screen according to claim 13,
    wherein the surface diffusion layer has a diffusion structure formed for the surface of the directional diffusion layer.
15. An image projection system comprising:
    a screen; and
    an optical image projector for projecting an optical image onto the screen,
    wherein the screen includes: a directional diffusion layer for scattering and transmitting light whose incident angle is within a specific angle range, and linearly transmitting light whose incident angle is outside the specific angle range; an isotropic diffusion layer for approximately isotropically diffusing light regardless of an incident angle thereof; and a light reflecting layer provided between the directional diffusion layer and the isotropic diffusion layer.
16. An image projection system according to claim 15,
    wherein the optical image projector projects light with an angle of view thereof is contained within the specific angle range.

17. An image projection system according to claim 15, wherein the specific angle range includes a center line directed toward a center of projected light from the optical image projector.

18. An image projection system according to claim 15, wherein the optical image projector projects light which is incident on the directional diffusion layer at an angle outside the specific angle range.

19. An image projection system according to claim 15, wherein the specific angle range includes a center line which is approximately symmetric with a center line of a projected light flux from the optical image projector with respect to a normal line to a screen surface.

* * * * *